United States Patent [19]

Medvetz et al.

[11] 4,240,223
[45] Dec. 23, 1980

[54] ANIMAL TRAP

[76] Inventors: Edward J. Medvetz, 220 Lincoln St., Homer City, Pa. 15748; Rudolph M. Yandrick, 267 S. Fourteenth St., Indiana, Pa. 15701

[21] Appl. No.: 94,379

[22] Filed: Nov. 15, 1979

[51] Int. Cl.³ .................................................. A01M 23/26
[52] U.S. Cl. ........................................... 43/58; 43/81; 43/92
[58] Field of Search ................................. 43/88–97, 43/58, 85, 77, 81, 81.5, 82; 64/28

[56] References Cited
U.S. PATENT DOCUMENTS

| | | |
|---|---|---|
| 40,124 | 9/1863 | Shepard . |
| 125,449 | 4/1872 | Frisbie . |
| 135,268 | 1/1873 | Flora . |
| 642,476 | 1/1900 | McCoy . |
| 988,259 | 3/1911 | Fauls .......................... 43/81 |
| 1,148,243 | 7/1915 | McDermott . |
| 1,243,588 | 10/1917 | Burns . |
| 1,795,806 | 3/1931 | Swann .......................... 43/81 |
| 1,886,203 | 11/1932 | Lavoie . |
| 2,201,307 | 5/1940 | Culbertson . |
| 2,222,653 | 11/1940 | Chambless ..................... 43/94 |
| 2,247,660 | 7/1941 | Lehn . |
| 2,877,596 | 3/1959 | Elencik . |

*Primary Examiner*—Nicholas P. Godici
*Attorney, Agent, or Firm*—Webb, Burden, Robinson & Webb

[57] ABSTRACT

A pan-type animal trap having a frame, a pair of jaws pivotally mounted on the frame and spring loaded arms pivotally mounted on the frame in cooperating relationship with the jaws to close the jaws. A pan pivotally mounted on the frame and located between the jaws when the jaws are open. A dog pivotally mounted on the frame overlying one of the jaws when the jaws are open and having a free end located under an end of the pan adjacent to the pivotal mounting of the pan. The free end of the dog and the end of the pan under which the free end of the dog is located having openings which are aligned when the free end of the dog is located below the end of the pan, and a frangible shear pin extending through the aligned openings to hold the pan and the dog together and provide the desired pan tension when the jaws are open.

9 Claims, 3 Drawing Figures

ANIMAL TRAP

Our invention relates generally to pan-type animal traps and more specifically to traps which are triggered by the weight of an animal on the trap pan.

A conventional pan-type animal trap has a finger-like extension on the pivotally mounted pan which engages with the end of a latch lever to hold the trap jaws open until force is applied to the pan to rotate it and disengage the finger-like extension and the latch lever. The engagement of the finger-like extension and the latch lever is very sensitive to insure that the weight of an animal will spring the trap and is uncontrollable. Because it is extremely sensitive and uncontrollable, this trigger arrangement often permits a trap to close accidentally while being set or positioned in the field. Additionally, the extreme sensitivity of the trigger arrangement permits a trap to close when the trap pan is contacted by an animal which is lighter in weight than the animal being trapped and this is undesirable. The trigger pressure required to spring a trap with an uncontrollable trigger arrangement cannot be consistently adjusted for different weight animals. Furthermore, an uncontrollable trigger arrangement may permit the pan to move or slip prior to triggering which can alert the animal on the pan to the presence of the trap and thereby permit the animal to escape.

Conventional pan-type traps having an uncontrollable trigger arrangement are disclosed in U.S. Pat. Nos. 2,877,596; 2,247,660; 2,201,307; 1,886,203; 1,243,588; 1,148,243; 642,476; 135,268; 125,449 and 40,124. All of these patents disclose arrangements wherein the trap may be accidentally sprung because it has the conventional uncontrollable trigger release between the trap pan and the latch lever which holds the trap jaws open. Additionally, the trigger pressure in these traps cannot be accurately or consistently adjusted for different animals.

A trap incorporating our invention has a shear pin extending through the openings in the pan and the dog or latch lever which eliminates sensitivity and pan slip and positively holds the pan in the set position. The size and material of the shear pin are selected to insure that the trap will not be sprung until a predetermined force is applied on the pan. Thus, the force required to trigger a trap incorporating our invention may be easily adjusted to suit various conditions and to accommodate animals of different weights by selecting the proper size and material for the shear pin. Additionally, our invention makes it possible to preset a trap before taking it into the field by inserting a heavy set pin. At the trap site the heavy set pin is removed and replaced with a preselected shear pin to suit conditions. Preset traps can be dyed, boiled or waxed in a shallow container rather than in a deep container. The treatment in a shallow container may be accomplished more economically than in a deep container which must be used when a trap is treated in the unset position. Our invention may be included on conventional traps with only minor modifications of the trap as will be pointed out in detail hereinafter.

Our invention is hereinafter more fully described in connection with the accompanying drawings in which.

Figure 1:
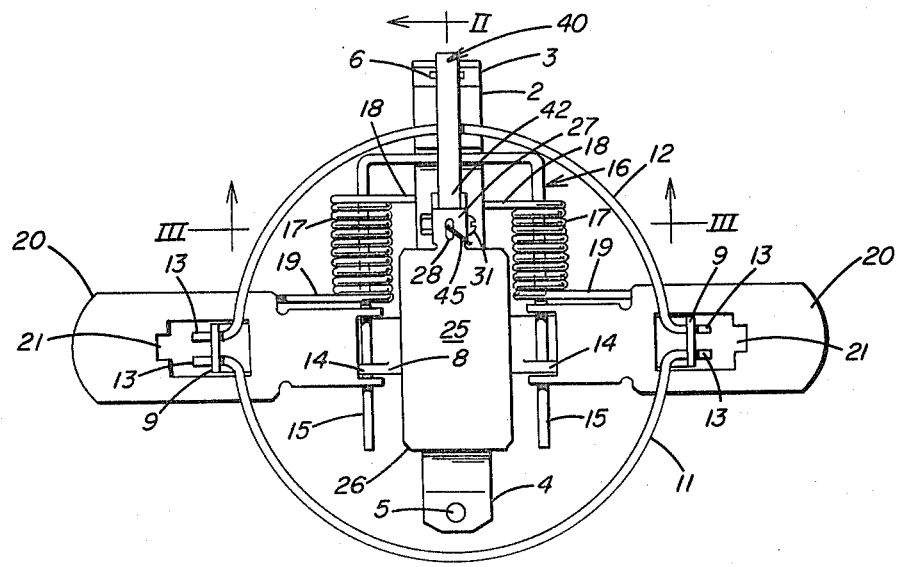
FIG. 1 is a plan view of a trap embodying our invention.

With specific reference to the drawings, a pan-type animal trap including our invention is shown in FIG. 1. The trap comprises a frame 1 having a member 2 with an upturned end 3 and a downturned end 4. The downturned end of member 2 is formed with an opening 5 to receive a chain or cable for attaching the trap to a tree or a stake or to a drag, and the upturned end 3 is formed with an opening 6 for a purpose to be described hereinafter. A second frame member 8 is welded at a right angle to the lower surface of frame member 2 and has upturned ends 9. Each end 9 is formed with a pair of spaced openings 10 to rotatably receive extensions 13 at the ends of jaws 11 and 12 of the trap. Member 8 is also formed with a pair of inverted V-shaped punch outs 14 which form slots located on opposite sides of frame member 2. These slots formed by punch outs 14 receive the ends of legs 15 of a U-shaped spring retainer 16 which is located above frame members 2 and 8. Each leg 15 of retainer 16 is surrounded by a coil spring 17. One end 18 of each coil spring 17 is located below and in contact with the bottom surface of frame member 2, and the other end 19 of each coil spring 17 extends outwardly from the center of the trap parallel to frame member 8. Each outwardly extending end 19 of a spring 17 contacts the lower surface of an arm 20 which is pivotally mounted on a leg 15 of U-shaped spring retainer 16. The upper surface of each arm 20 contacts both jaws 11 and 12 to rotate the jaws toward each other to trap an animal which triggers the trap by applying weight to the trap pan. Arms 20 are identical and each is formed with an enlarged opening 21 which embraces an upturned end 9 of member 8. The above described trap is a conventional predator pan-type trap and is commercially available with an uncontrollable trigger arrangement.

Figure 2:
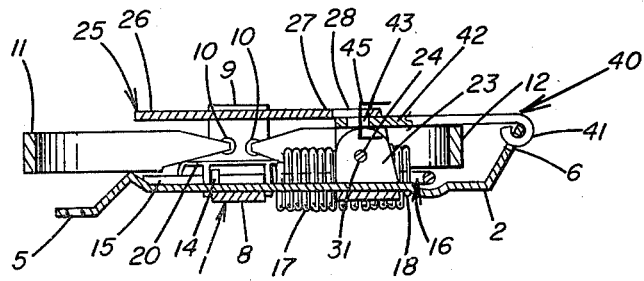
FIG. 2 is a vertical section on line II—II of FIG. 1.
Figure 3:
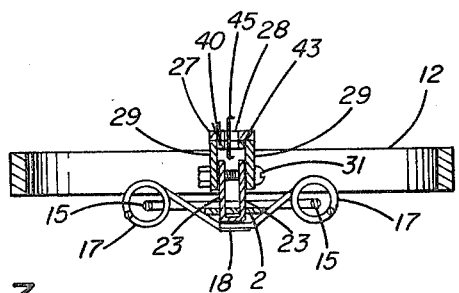
FIG. 3 is a vertical section on line III—III of FIG. 1.

Our invention comprises the pan, the dog and the shear pin arrangement which replaces the uncontrollable trigger arrangement on conventional traps. A pair of spaced lugs 23 with aligned holes 24 therethrough extends upwardly from frame member 2. The trap pan 25 has a substantially rectangular contact portion 26 and neck portion 27 which has a slot 28 formed the rein. While we have shown a pan with a substantially rectangular contact portion, it will be understood by those skilled in the art that other configurations of the contact portion may be used without departing from our invention. A pair of spaced lugs 29 extends downwardly from the lower surface of neck portion 27 of pan 25. Lugs 29 have aligned holes which are also aligned with the holes 24 in lugs 23 when the pan is in position on the trap frame. A bolt or pin 31 extends through the aligned holes in lugs 23 and 29 to pivotally mount the pan on frame 1. As shown in FIG. 1, the contact portion of the pan is located between jaws 11 and 12 when the trap is in the set position. A dog 40 is pivotally mounted in opening 6 in the upturned end of element 2 by means of an eye 41. When the trap is in the set position, dog 40 overlies jaw 12 to hold the jaws open and the free end 42 of dog 40 extends below neck portion 27 of pan 25 as shown in FIG. 2 of the drawings. The free end of dog 40 has an opening 43 which is aligned with a portion of slot 28 in neck portion 27 of pan 25 when the free end of dog 40 is located below the neck portion. A frangible shear pin 45 extends through slot 28 and opening 43 to hold the pan and the dog in the set position. When force is applied to the pan by an animal, the pan tends to pivot in the downward direction about pin 31, and if the weight of the animal on the pan is sufficient, the shear pin extending through slot 28 and opening 43 will break and permit dog 40 to pivot upwardly about eye 41 to release jaw 12 and arms 20. Arms 20 are rotated upwardly by the ends 19 of springs 17 and they rotate jaws 11 and 12 to move the jaws toward each other to trap the animal which triggered the trap.

In setting the trap the jaws are moved to their open position against the pressure of springs 17, and dog 40 is brought into position over jaw 12 with its free end 42 under neck portion 27 of pan 25 to align opening 43 of the dog with slot 28 in the neck portion of the pan. A shear pin 45 is then placed through slot 28 and opening 43 to hold the pan in the set position. The trap is then ready for placement in the field.

Traps with shear pins according to our invention are safer to handle than conventional traps which have an uncontrollable trigger release since when the trapper is setting and otherwise handling a trap, it is not likely to be accidentally sprung because the shear pin positively holds the jaws in the open position until a predetermined force is applied to the pan. Additionally, the force required to trigger a trap incorporating our invention may be adjusted by changing the size of the pin and the material from which the pin is made and is consistently repeatable each time a trap is set by selecting and inserting a pin having the same diameter and made of the same material. Thus, the larger the diameter of the shear pin, the greater the force required on the pan to trigger the trap.

A reason why sensitive hair triggers are presently used on traps is that it is necessary to prevent the animal from feeling the pan slip without release which may be caused when an animal contacts the pan. The shear pin arrangement of our invention eliminates pan slip, and, therefore, a sensitive hair trigger arrangement is unnecessary. Our invention also insures that lighter weight animals than those desired to be trapped will not be trapped which is an important advantage in protecting those animals.

While we have shown and described preferred embodiments of our invention, it will be understood that our invention may be otherwise embodied within the scope of the appended claims.

We claim:

1. In an animal trap having a frame, a pair of jaws rotatably mounted on said frame, spring means on said frame to urge said jaws toward each other from the set position, a pan located between said jaws when said jaws are in the set position, means pivotally mounting said pan on said frame, a dog adapted to contact said pan and hold said jaws in the set position and means pivotally mounting said dog on said frame, the improvement comprising an opening formed in said pan and a corresponding opening formed in said dog aligned with said opening in said pan when said pan and said dog are in contact when the trap is in the set position and a frangible shear pin extending through said openings in said pan and said dog to maintain contact between said pan and said dog, whereby a controlled and adjustable trigger arrangement is provided.

2. The improvement set forth in claim 1 wherein at least one of said openings in said pan and in said dog is an elongated slot.

3. The improvement set forth in claim 1 wherein said pan has a contact portion and a neck portion and said opening in said pan is formed in said neck portion.

4. The improvement set forth in claim 3 wherein the opening in said neck portion is an elongated slot and wherein said dog has a free end spaced from said means pivotally mounting said dog on said frame, said free end of said dog being located below said elongated slot when the trap is in the set position.

5. The improvement as set forth in claim 1 wherein said pan has a neck portion adjacent to said means pivotally mounting said pan on said frame, said dog having a free end spaced from said means pivotally mounting said dog on said frame, said neck portion of said pan overlying said free end of said dog when said jaws are open in the set position, said opening in said pan being formed in said neck portion and said opening in said dog being formed in said free end.

6. The improvement set forth in claim 5 wherein at least one of said openings in said pan and said dog is an elongated slot.

7. A trap having at least one member adapted to contact and hold an animal, operative means to move said member from a set position to a closed position, a trigger arrangement for holding said operative means when said member is in a set position, said trigger arrangement including restraining means to restrain movement of said operative means when said member is in a set position, and frangible shear pin cooperating with said restraining means when said restraining means restrains movement of said operative member, whereby application of force to said restraining means breaks said shear pin to permit said operative means to move said member from a set position to a closed position.

8. A trap having a frame, means mounted on said frame to firmly grasp and hold an animal, spring means on said frame to move said means for grasping an animal from a set position to a closed position, a pan, means pivotally mounting said pan on said frame, a dog adapted to contact said pan and hold said means for grasping an animal in a set position and means pivotally mounting said dog on said frame, an opening formed in a portion of said pan and a corresponding opening formed in a portion of said dog and aligned with said opening in said pan when said pan and said dog are in contact when the trap is in a set position, and a frangible shear pin extending through said opening in said pan and said opening in said dog when the trap is in a set position to maintain contact between said pan and said dog, whereby a controlled and adjustable trigger mechanism is provided to permit movement of said means for grasping an animal from an open position to a closed position when sufficient force is applied to said pan to break said shear pin.

9. A trigger arrangement for use in a trap, said trigger arrangement including a first member with an opening formed the rein and having a contact surface, a restraining member in cooperative relationship with said first member and a frangible shear pin extending through said opening in said first member, whereby application of a predetermined force to said contact surface of said first member breaks said shear pin and terminates the cooperative relationship between said first member and said restraining member.

* * * * *